| United States Patent [19] | [11] 3,817,457 |
| --- | --- |
| Clark | [45] June 18, 1974 |

[54] PROCESSING OF PARTICULATE MATERIALS

[75] Inventor: Norman Owen Clark, Par, England

[73] Assignee: English Clays Lovering Pochin & Company Limited, Cornwall, England

[22] Filed: Feb. 4, 1972

[21] Appl. No.: 223,751

[30] Foreign Application Priority Data
Feb. 10, 1971  Great Britain...................... 4412/71

[52] U.S. Cl.......................... 241/4, 241/20, 241/22
[51] Int. Cl.............................. B02c 19/12
[58] Field of Search ..................... 241/4, 14, 22, 20

[56] References Cited
UNITED STATES PATENTS

| 1,771,477 | 7/1930 | Alton | 241/14 |
| 2,173,975 | 9/1939 | Lyons | 241/14 |
| 3,034,859 | 5/1962 | Gunn et al. | 241/4 X |
| 3,075,710 | 1/1963 | Feld et al. | 241/22 X |
| 3,464,634 | 9/1969 | Brociner | 241/4 |

Primary Examiner—Granville Y. Custer, Jr.
Attorney, Agent, or Firm—Stevens, Davis, Miller & Mosher

[57] ABSTRACT

A process for comminuting particulate solid materials by shearing forces in which the particulate solid is subjected to the shearing forces in the form of a plastic mass containing a second particulate solid whose particles are substantially coarser than those of the particulate solid to be comminuted. After completion of the shearing operation, the two particulate solids are separated, for example by diluting the plastic mass with water and then passing the material through a sieve which will retain the coarse particles of the second particulate solid.

15 Claims, No Drawings

PROCESSING OF PARTICULATE MATERIALS

BACKGROUND OF THE INVENTION

This invention relates to the processing of particulate materials and, more particularly but not exclusively, is concerned with the comminution of minerals.

It is known to subject particulate materials, especially minerals, in high shear-type of apparatus with a view to improving the rheological properties of the material. The efficiency of a process which is performed in a high shear-type of apparatus, for example a pugmill, a muller mixer, an edge runner mill, an extruder, or a Z-blade mixer, depends inter alia upon the shearing gradient which is a function of the difference in velocity between two approximately parallel surfaces, for example of adjacent particles or of a particle and a surface of the high shear type of apparatus, and of the distance between the two surfaces. One method of measuring the efficiency is to measure the modulus of rupture of a standard bar formed from the particulate material under standard conditions; the higher the modulus of rupture, the more efficient the processing. Another method of measuring the efficiency is to determine the solids content of a suspension of the particulate material which would have a given viscosity; the higher the solids content, the more efficient the processing.

SUMMARY OF THE INVENTION

According to the present invention there is provided a process for treating a particulate solid material which process comprises forming a plastic mass containing a first particulate solid material to be treated and a second particulate solid material predominantly consisting of particles substantially coarser than the particles of the first particulate solid material to be treated, subjecting the plastic mass to shearing forces, and thereafter separating the second particulate solid material and the particles of the first particulate solid material.

The present invention is of particular value in the comminution of minerals, for example clay minerals, in a high shear-type of apparatus. In such a case, the particulate solid material to be treated will generally consist predominantly of particles smaller than 50 microns equivalent spherical diameter (e.s.d.).

DESCRIPTION OF THE PREFERRED EMBODIMENTS

The second particulate solid material which predominantly consists of particles substantially coarser than the particles of the first particulate solid material to be treated can be a mineral, a ceramic, a metallic material or a plastics material. A suitable material is a silica sand. The second particulate solid material will generally consist of particles which have diameters in the range of from 6 mm to 10 microns, depending on the size of the particles of the particulate solid material to be treated. Preferably, the second particulate solid material will consist of particles having a size in the range of from 0.15 to 1.00 mm. with a median particle size at least 10 times larger and most preferably at least 20 times larger than the median particle size of the particles of the first particulate solid material.

Advantageously, the second particulate solid material is used in a quantity such that the plastic mass contains from 20–80 parts by volume of the first particulate solid material to be treated and from 80–20 parts by volume of the second particulate solid material. (When the first particulate solid material and the second particulate solid material have substantially the same specific gravities, the volume ratio and weight ratio of the two materials will be substantially the same; this will be the case, for example, when the first particulate solid material is a clay mineral and the second particulate solid material is a silica sand).

The first and second particulate solid materials are mixed with a quantity of liquid, for example water, sufficient to form a plastic mass.

when using a continuously operable high shear-type apparatus, for example a pugmill, it may be found to be advantageous to pass the plastic mass two or more times through the apparatus.

After completing the shearing process, the first and second particulate solid materials are separated from one another, for example by diluting the plastic mass with a liquid and then employing a conventional method for separating particles of different size, e.g., sieving, gravitational sedimentation or centrifuging. Alternatively, there may be employed a separation process which depends on there being a difference in another physical property, for example magnetic susceptibility, between the two particulate solid materials.

The treated first particulate solid material can be divided into two or more separate fractions, according to particle size or other physical property, and one or more of these fractions, as desired, can be returned to the high shear-type apparatus for further comminution.

The invention is illustrated by the following Examples.

EXAMPLE 1

Samples of a coarse, residue English kaolin clay having a median particle size of about 13 microns and a particle size distribution such that 15 percent by weight consisted of particles having an equivalent spherical diameter smaller than 2 microns were treated in the following ways:

Sample A: 500 g. portions of the kaolin clay were each mixed with 500 g. of a silica sand consisting of particles having a median particle size of about 320 microns and diameters in the range 0.15 to 0.50 mm, and with varying quantities of water to form plastic compositions each of which was treated in a laboratory auger-type pugmill. The quantity of energy dissipated in the plastic composition per unit weight of dry kaolin clay was noted.

After treatment in the laboratory auger-type pugmill, each plastic mass was slurried with sufficient water to form a fluid suspension which was poured through a No. 120 mesh B.S. sieve (nominal aperture 124 microns) to separate the kaolin clay from the silica sand. The suspension of kaolin clay was then de-aired under vacuum and de-watered by filtration.

The plastic masses obtained following filtration were hand-wedged and then extruded to form rods about 12 inches, or 300 mm, in length and 1/4 in., or 6.5 mm, in diameter. The plastic rods were air-dried for about 24 hours and then dried for a few hours in an oven at 60° C. so as to reduce the moisture content to about 0.5 percent by weight or less. The rods were then conditioned for 16 hours at 80 percent R.H. and 20° C and finally cut into 4 inch, or 100 mm, lengths. The modulus of rupture for the kaolin was then determined by supporting each rod on two knife edges a known distance, P cm., apart and applying a continuously increasing load to the point midway between the two knife edges. The load, L kg., at the instant of rupture was recorded, and the modulus of rupture was calculated from the formula:

modulus of rupture = 8 PL/$\pi$D$^3$ where D is the diameter of the rod in cm.

The proportion by weight of the treated kaolin which consisted of particles having an equivalent spherical diameter smaller than 2 microns was also measured.

The modulus of rupture of the treated kaolin and the proportion by weight of the treated kaolin consisting of particles having an equivalent spherical diameter smaller than 2 microns, corresponding to the dissipation in the plastic mass of 136 and 250 horsepower hours of energy per ton of dry kaolin (corresponding to 3.6 × 10$^5$ and 6.6 × 10$^5$ J kg$^{-1}$, respectively), were determined by interpolation.

Sample B: 500 g. portions of the kaolin clay were each made into a plastic mass with different quantities of water. Each plastic mass was treated in the laboratory auger-type pugmill and the quantity of energy dissipated in each plastic mass per unit weight of dry kaolin was determined.

The modulus of rupture of the kaolin and proportion by weight of the treated kaolin consisting of particles having an equivalent spherical diameter smaller than 2 microns, were measured as described for Sample A above for each portion and the data obtained interpolated to 136 and 250 horsepower hours of energy per ton of dry kaolin.

Sample C: A slurry comprising 500 g. of the kaolin clay, 1,200 g. of Leighton Buzzard silica sand consisting of particles with diameters in the range of from 0.5 to 1.0 mm, and 700 ml. of water was stirred in a cylindrical poly(vinyl chloride) vessel by means of a rotating impeller comprising a vertical shaft carrying at its lower end four stainless steel cylindrical bars covered with poly(vinyl chloride) sleeves. The stirring was carried out for a time sufficient to dissipate in the slurry 136 horsepower hours to energy per ton of dry kaolin. The slurry was then poured through a No. 120 mesh B.S. sieve (nominal aperture 125 microns) to separate the kaolin suspension from the sand. The slurry was de-aired under vacuum and then de-watered by filtration.

A second slurry having the same constitution was treated in a similar manner except that the stirring was continued until there had been dissipated in the slurry 250 horsepower hours of energy per ton of dry clay.

The results obtained in the experiments on Samples A, B and C, are given in the Table I below:

TABLE I

| | % by wt. smaller than 2$\mu$m e.s.d. | modulus of rupture, 80% R.H., (Kg.cm$^{-2}$) |
|---|---|---|
| Original Kaolin | 15 | about 1 |
| a) 136 hp.-hr/ton (3.6×10$^5$ J kg$^{-1}$) | 45 | 7.2 |
| 250 hp.-hr/ton (6.6×10$^5$ J kg$^{-1}$) | 53 | 11.2 |
| b) 136 hp.-hr/ton (3.6×10$^5$ J kg$^{-1}$) | 35 | 5.6 |
| 250 hp.-hr/ton (6.6×10$^5$ J kg$^{-1}$) | 39 | 7.2 |
| c) 136 hp.-hr/ton (3.6×10$^5$ J kg$^{-1}$) | 49 | 3.1 |
| 250 hp.-hr/ton (6.6×10$^5$ J kg$^{-1}$) | 58 | 4.1 |

TABLE I-Continued

It will be seen that the sample of kaolin clay treated in accordance with the present invention, viz. Sample A, had a higher modulus of rupture than the other samples.

EXAMPLE 2

Samples of a coarse, residue English kaolin clay having a median particle size of about 18 microns and a particle size distribution such that 5 percent by weight consisted of particles having an equivalent spherical diameter smaller than 2 microns were mixed with Leighton Buzzard silica sand consisting of particles having a median particle size of 730 microns and in the range 0.5 to 1.0 mm, and with water in different proportions and the resultant plastic masses were treated in a laboratory auger-type pugmill, the amounts of energy dissipated in the pastes being determined per unit weight of dry clay.

The modulus of rupture and proportion by weight of particles having an equivalent spherical diameter smaller than 2 microns were determined for the original kaolin clay and for each of the treated samples of kaolin clay.

The results obtained are shown in Table II below:

TABLE II

| Composition of solids in paste | | % by wt. of water | Energy dissipated in paste | | % by wt. smaller than 2$\mu$m e.s.d. | modulus of rupture 80% RH (Kg.cm$^{-2}$) |
|---|---|---|---|---|---|---|
| % by wt. kaolin | % by wt. sand | | | (J kg$^{-1}$ ×10$^4$) | | |
| Original kaolin | — | — | — | | 5 | ca.1 |
| 70 | 30 | 18.4 | 62.5 | (16.5) | 30 | 4.9 |
| 70 | 30 | 16.4 | 127 | (33.6) | 40 | 8.1 |
| 50 | 50 | 14.3 | 116 | (30.6) | 36 | 8.0 |
| 50 | 50 | 12.4 | 198 | (52.4) | 45 | 11.7 |
| 30 | 70 | 12.5 | 67.4 | (17.8) | 33 | 6.1 |
| 30 | 70 | 11.3 | 188 | (49.6) | 40 | 8.6 |

EXAMPLE 3

A kaolin clay having a median particle size of 1.3 microns and a particle size distribution such that 62 percent by weight consisted of particles smaller than 2 microns equivalent spherical diameter was mixed for two minutes a dough mixer with Leighton Buzzard sand which consisted of substantially spherical silica particles having diameters in the range 0.5-1.0 mm. and a median particle size of 730 microns. The kaolin clay was added in the form of a filter press cake containing 30 percent by weight of water which was first shredded to form flakes of about 10g each in weight in order to promote the formation of a homogeneous mixture with the sand in the dough mixer. The proportions by volume of the components in the mixture were 37 parts of clay, 22 parts of sand and 41 parts of water, and the volume ratio of clay to sand was thus 62 parts of clay to 38 parts of sand. Samples of the mixture were treated in a laboratory auger-type pugmill, each sample having dissipated therein a different quantity of energy per unit weight of dry kaolin clay. The treated kaolin was then separated from the silica sand by slurrying the mixture in sufficient water to give a fluid suspension which was then poured through a No. 200 mesh B.S. sieve (nominal aperture 76 microns). The samples of kaolin clay were then tested for viscosity in aqueous suspension by the following method. Sufficient kaolin clay was filtered from the suspension and dried to ensure 650 g. after milling and a small sample of the milled clay was mixed with increasing quantities of distilled water containing sodium hydroxide and sodium hexametaphosphate as dispersing agents until the mixture would just flow from the end of a glass rod. The solids content of this mixture was then determined by weighing a sample of the mixture, evaporating to dryness and weighing again. 600 g. of the milled clay were then weighed out and sufficient water to give with this quantity of clay a suspension having a solids content greater by 2 percent than that of the suspension which would just flow was poured into a mixer provided with a high speed impeller. Sodium hydroxide and sodium hexametaphosphate were dissolved in the water as dispersing agents. The mixer was started at a moderate speed and the clay was added slowly until all of it was dispersed in the water. The impeller speed was then increased to maximum and mixing was continued until 20,000 revolutions of the impeller had been recorded. After mixing, a sample of the suspension was cooled to 22° C and its viscosity measured with a Brookfield viscometer at speed 100, spindle 3. The solids content of the sample was then determined as described above. A further sample of the suspension in the mixer was taken and diluted with water to give a solids content which was lower by about 2 percent than the first sample. The viscosity and solids content of the second sample were then determined as above. It has been found that in the range of solids contents in which the measurements are made the solids content is directly proportional to the reciprocal of the square root of the viscosity. This relationship enables the solids content of the suspension which has a viscosity of 5 poise to be determined. The particle size distribution of the kaolin was also determined and the results obtained are shown in Table III below.

TABLE III

| Energy dissipated in paste | | % by weight of particles smaller than | | % solids content of a suspension of viscosity 5 poise |
|---|---|---|---|---|
| hp-hr/ton | (J·kg⁻¹ × 10⁴) | 7μm | 2μm | |
| 0 | (0) | 46 | 62 | 68.9 |
| 20 | (5.3) | 53 | 64 | 71.7 |
| 33 | (8.7) | 57 | 70 | 71.6 |
| 49 | (12.9) | 62 | 72 | 72.3 |

EXAMPLE 4

The same kaolin clay and the same silica sand as were used in Example 3 were mixed in the dough mixer to form a homogeneous mixture containing 28 parts by volume of clay 40 parts by volume of sand and 32 parts by volume of water. The volume ratio of clay to sand was thus 41 parts of clay to 59 parts of sand. Samples of the mixture were treated in a laboratory auger-type pugmill, different quantities of energy per unit weight of dry kaolin being dissipated in the paste in each case. The treated kaolin was then separated from the sand and tested for the solids concentration at 5 poise viscosity at 22° C and for particle size distribution as described in Example 3 above. The results obtained are shown in Table IV below.

TABLE IV

| Energy dissipated in paste | | % by weight of particles smaller than | | % solids content of a suspension of viscosity 5 poise |
|---|---|---|---|---|
| hp-hr/ton | (J·kg⁻¹ × 10⁴) | 1μm | 2μm | |
| 0 | (0) | 46 | 62 | 68.9 |
| 53 | (14.0) | 56 | 71 | 71.0 |
| 89 | (23.5) | 57 | 71 | 71.9 |
| 167 | (44.1) | 60 | 73 | 72.8 |

The foregoing Examples indicate that good results can be obtained when the relative quantities, in parts by volume, of the first particulate solid material to be treated and the second particulate solid material are in the range 65:35 to 35:65.

I claim:

1. In a process for treating a particulate solid mineral by subjecting the particulate solid mineral to shearing forces, the improvement which comprises forming a plastic mass consisting of the first particulate mineral to be treated, a second particulate solid material consisting of particles having a size in the range of 0.15 to 1.00 mm, and water, the ratio of the quantities, in parts by volume, of the first particulate solid mineral to the second particulate solid material in the plastic mass being in the range of 20:80 to 80:20 and the water in the plastic mass constituting from about 11 percent to about 18 percent by weight of the plastic mass; subjecting the plastic mass to shearing forces; and thereafter diluting the plastic mass and subjecting the diluted plastic mass to an operation in order to separate the second particulate solid material and the particles of the first particulate solid mineral.

2. A process according to claim 1, wherein said first particulate solid mineral is a clay.

3. A process according to claim 1 wherein the second particulate solid material has a median particle size at least ten times larger than the median particle size of the particles of the first particulate solid mineral.

4. A process according to claim 1, wherein said first particulate solid mineral consists predominantly of particles smaller than 50 microns.

5. A process according to claim 1, wherein the plastic mass is subjected to shearing forces in a pugmill.

6. A process according to claim 1, wherein the plastic mass is subjected to shearing forces in a muller mixer.

7. A process according to claim 1, wherein the plastic mass is subjected to shearing forces in an edge runner mill.

8. A process according to claim 1, wherein the plastic mass is subjected to shearing forces in an extruder.

9. A process according to claim 1, wherein the plastic mass is subjected to shearing forces in a Z-blade mixer.

10. A process according to claim 1, wherein the diluted plastic mass is subjected to a sieving operation.

11. A process according to claim 1, wherein the diluted plastic mass is subjected to a centrifuging operation.

12. A process according to claim 1, wherein the diluted plastic mass is subjected to a gravitational sedimentation process.

13. A process according to claim 1, wherein said ratio is 35:65 to 65:35.

14. A process according to claim 13, wherein said second particulate solid material is a silica sand.

15. A process according to claim 14, wherein the plastic mass is subjected to said shearing forces until at least 100 horsepower hours of energy have been dissipated in the plastic mass per ton of the first particulate solid mineral.

* * * * *